United States Patent [19]

Harada et al.

[11] Patent Number: 4,535,363
[45] Date of Patent: Aug. 13, 1985

[54] ELECTRONIC IMAGE SENSING APPARATUS

[75] Inventors: Nozomu Harada; Okio Yoshida, both of Yokohama, Japan

[73] Assignee: Tokyo Shibaura Denki Kabushiki Kaisha, Kawasaki, Japan

[21] Appl. No.: 478,104

[22] Filed: Mar. 23, 1983

[30] Foreign Application Priority Data

Mar. 31, 1982 [JP] Japan .................. 57-51418

[51] Int. Cl.³ .............................. H04N 3/14
[52] U.S. Cl. ..................... 358/213; 358/225
[58] Field of Search ........... 358/209, 211, 212, 213, 358/214, 215, 216, 217, 167, 56, 225, 227, 228

[56] References Cited

U.S. PATENT DOCUMENTS

| | | | |
|---|---|---|---|
| 3,824,336 | 7/1974 | Gould et al. | 358/214 |
| 4,057,830 | 11/1977 | Adcock | 358/127 |
| 4,131,919 | 12/1978 | Lloyd et al. | 360/9 |
| 4,161,000 | 7/1979 | Cleveland | 358/225 |
| 4,164,761 | 8/1979 | Matchell | 358/215 |
| 4,242,703 | 12/1980 | Tsuboshima et al. | 358/150 |
| 4,471,388 | 9/1984 | Dischert | 358/320 |

Primary Examiner—Gene Z. Rubinson
Assistant Examiner—Robert Lev
Attorney, Agent, or Firm—Oblon, Fisher, Spivak, McClelland & Maier

[57] ABSTRACT

An electronic still camera is disclosed which includes a solid state image sensor such as charge transfer device (CTD) and a shutter mechanism. For obtaining a still picture of one frame composed of two fields according to an NTSC television system, the shutter mechanism is driven so as to be opened before and after a signal charge read out period of a CTD by a shutter period control circuit. With this arrangement, the field image light is incident on the CTD in every field period.

9 Claims, 27 Drawing Figures

ELECTRONIC IMAGE SENSING APPARATUS

BACKGROUND OF THE INVENTION

The present invention relates to an electronic image sensing apparatus, and more particularly to an electronic still camera containing a solid state image sensor such as a charge transfer device, which is suitable for high shutter speed operation.

A solid state image sensor, such as a charge transfer device (CTD) including a charge coupled device (CCD) is superior to the conventional image pick-up tube in many points. For example, the image sensor is small in size, light in weight, and high in reliability. Further, it is essentially free from pattern distortion and sticking, and is little influenced by after image. Because of such advantageous features, the solid state image sensor has a prospect of increasing applications in many fields, for example, in ITV, and small commerical video cameras. In particular, the application of the solid state image sensor to an electronic still camera replacing a conventional camera using a silver salt film has recently attracted a great deal of attention.

The solid state image sensor for the present VTR camera is constructed so as to be adaptable to the NTSC television system in which one frame consists of two fields. For reading out and reproducing the picture information of all the photosensitive cells of the image sensor, the shutter of the electronic camera must be open for at least 1/30 of a second or more. In normal use, however, 1/30 second is a relatively long time. Unless the camera body, for example, is firmly fixed by means of a tripod or the like an undesirable movement of the camera will inevitably be caused by uncontrollable movements of the operator's body.

For obtaining a high speed photography within the shutter opening time of 1/30 second, the read frequency of the image sensor must be set at a high frequency in order to reduce one frame period. In a CCD image sensor having 500 (vertical)×400 (horizontal) picture elements, for example, the read frequency is ordinarily high, e.g. 7.16 MHz. Even if the read frequency can be set at 14.32 MHz, i.e., double the former, the shutter speed of the electronic camera is at most 1/60 second. A shutter speed of approximately 1/1000 second is necessary for high speed photography. Therefore, if only the read frequency of the CCD image sensor is increased to obtain a shutter speed of 1/1000 second, the read frequency will be 240 MHz. However, if the read frequency of the CCD image sensor is set at such an extremely high value, the drive and the signal processing of the CCD image sensor become extremely difficult, and therefore it is not practical.

Accordingly, when designing an electronic still camera for high speed photography while allowing for the above-factors, the interlacing photography technique has not been employed. Therefore, a still image formed by the electronic camera has one field picture, and the number of picture elements is reduced. This undesirably leads to a degradation of the resolution of the picture image, and thus, poor picture quality.

SUMMARY OF THE INVENTION

Accordingly, an object of the present invention is to provide a new and improved electronic image sensing apparatus with a solid state image sensing element which can photograph an object in a high speed mode, while maintaining good picture quality of the reproduced picture.

An electronic image sensing apparatus according to the present invention such as an electronic still camera has a solid state image sensing element. The solid state image sensor is provided with a photosensitive section including a plurality of photo cells and a charge readout section. The image sensor receives an incident image light, and generates and stores signal charges corresponding to the image light in the photosensitive section. The signal charges are simultaneously transferred to the charge readout section to read out the charges. After reading out the charges, the signal charges are generated and stored corresponding to the incident image light. The shutter device opens at a proper shutter speed for irradiating the soild state image sensing element with the image light. The apparatus of the present invention includes a control device connected to the solid state image sensing element and the shutter device, which drives the shutter device so as to open before and after the signal charge read period in synchronism with the signal charge read operation of the image sensing element.

BRIEF DESCRIPTION OF THE DRAWINGS

The present invention is best understood by reference to the accompanying drawings, in which.

DETAILED DESCRIPTION OF THE PREFERRED EMBODIMENTS

Before processing with a description of the embodiments of the present invention, a description will first be given of a drive system for a solid state image sensor used for a conventional electronic still camera.

Figure 1A:
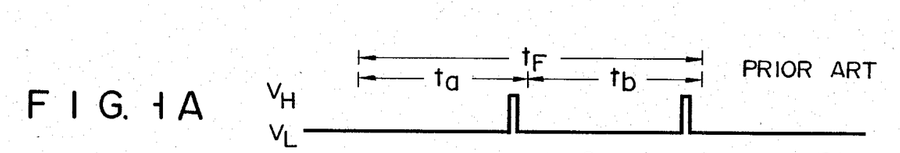
FIGS. 1A to 1C show waveforms of signals generated at major sections of an electronic still camera containing a conventional interline transfer CCD (IT-CCD)
Figure 1B:
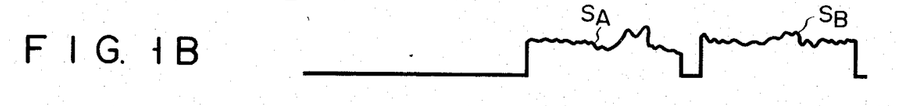
Figures 1C, 2:
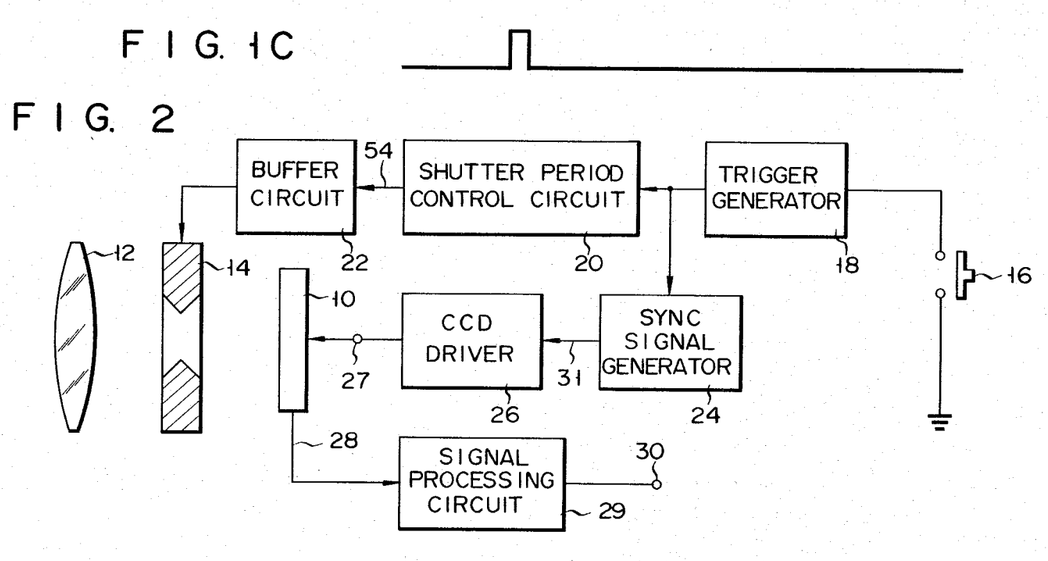
FIG. 2 shows a block diagram of an overall system of the electronic still camera which is a first embodiment of the present invention.

FIG. 1A shows a waveform of a voltage signal applied to a field shift gate (referred to as an FSG) of a charge coupled device of the interline transfer type (IT-CCD) with a photo cell matrix of M×2N (M and N: positive integers), which is applied to the conventional electronic camera. FIG. 1B shows a waveform of a field image signal produced from the IT-CCD in a high speed operation mode of an electronic camera in which the camera operates at 1/30 second or less. FIG. 1C shows a waveform illustrating a shutter opening time in a high speed mode of the electronic camera in which the camera operates at 1/30 second or less.

The IT-CCD applied to the electronic still camera performs the image sensing operation on the basis of the interlace scanning in which one frame consists of two fields, for example. In one of the field periods (referred to as an A field $t_a$), signal charges stored in the IT-CCD are read out through a vertical CCD (not shown) with signal charges, which are integrated in a pair of cells disposed adjacent to each other in the vertical direction of the cell matrix, as a unit picture element. In the other field period (referred to as a B field $t_b$), signal charges of the IT-CCD are read out with one picture element containing signal charges stored in a pair of cells spatially arranged 180° different in phase from the pair of cells which are subjected to the readout operation in the A field $t_a$. The above signal integration mode is generally called a "field storage mode". In this case, the field picture signals read out in the A and B fields in the vertical direction of the reproduced picture are spatially displaced 180° from each other. As a result, 2N×M of incident picture sampling points are obtained over the entire photosensitive area of the IT-CCD.

When the shutter of the conventional electronic camera containing the IT-CCD thus arranged is open within the field A period $t_a$, as shown in FIG. 1C, the image light is incident on the IT-CCD through the open shutter. The signal charge $S_A$ generated and stored in the photo cell matrix during the field A period $t_a$ through the IT-CCD image sensing or picking-up operation is read out during the next field B period, as shown in FIG. 1B. Thus, the field A image sensing signal $S_A$ is obtained after the delay of one field period. The field B image sensing signal $S_B$ is likewise obtained with the delay of one field period after the field B period $t_b$ is terminated.

In the IT-CCD used for the conventional electronic still camera, after the signal charges stored in the field A period are transferred to the vertical CCD section, the signal charges are stored anew during the field B period $t_b$. Therefore, to obtain the field B image signal $S_B$, additional light must be applied to the IT-CCD during the field B by taking suitable measures, for example, by opening the shutter again. Nevertheless, in the conventional electronic camera with a high speed shutter mechanism in which the shutter opens only once during the field A period as shown in FIG. 1C, it is impossible to obtain the field B image signal $S_B$ of FIG. 1B. Therefore, the image sensing sampling points obtainable from the entire photosensitive area of the IT-CCD are N×M at most. This number of sampling points is half of those (2N×M) of whole sampling points originally provided in the IT-CCD. As a result, through the high speed operation of 1/60 second or less, the number of picture elements in the vertical direction is reduced by half and the reproduced image suffers from degradation of resolution. As described above, in the conventional design, for high speed operation to be realized without degrading the resolution, the shutter speed cannot be improved beyond 1/60 second. If the shutter speed is further increased, the resolution becomes degraded and the resultant image sensing apparatus becomes impractical.

Referring now to FIG. 2, there is schematically illustrated an electronic still camera with a solid state image sensor which is a first embodiment of the present invention. An interline transfer type charge coupled device (IT-CCD) 10 is provided as the solid state image sensor of this electronic still camera. The IT-CCD 10 receives incident image light (not shown) through a lens 12 and a shutter mechanism 14 operable with a high shutter speed of 1/30 sec or less, for example, 1/1000 sec. A release button 16 is connected between a trigger generating circuit 18 and ground. The trigger generator 18 is connected to the shutter mechanism 14 through a shutter period control circuit 20 for controlling the opening and closing of the shutter mechanism 14 and a buffer circuit 22. The trigger generator 18 is electrically connected to the IT-CCD 10 through a sync signal generating circuit 24, a CCD driver 26 and a gate terminal 27. An image sensing signal 28 from the IT-CCD 10 is supplied to an output terminal 30 through a signal processing circuit 29 containing an amplifier (not shown). The CCD driver 26 drives the IT-CCD 10 in response to a sync signal 31 generated by the sync signal generating circuit 24.

Figure 3:
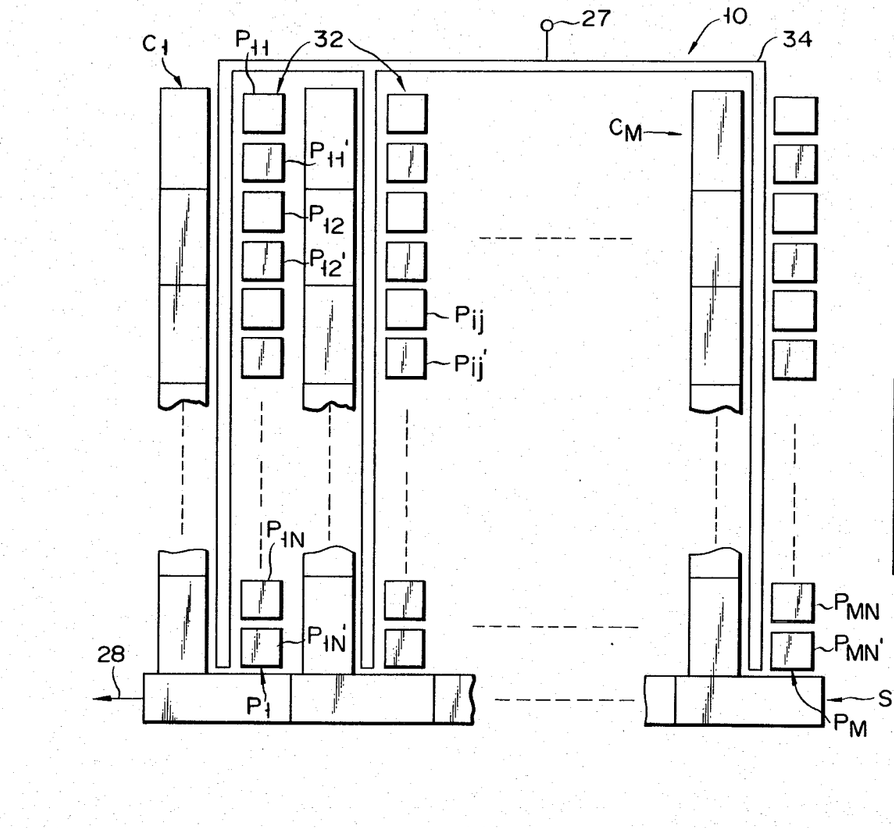
FIG. 3 shows a plan view of a photographing area of an interline transfer charge coupled device (IT-CCD) contained in the still camera of FIG. 2.

The IT-CCD 10 is provided, as shown in FIG. 3, with a photosensitive portion 32 made up of photosensitive elements, for example, photodiodes $P_{11}$, $P_{11}'$, $P_{12}$, $P_{12}'$, ..., $P_{1N}$, $P_{1N}'$, ..., $P_{ij}$, $P_{ij}'$, ..., $P_{MN}$, $P_{MN}'$. Of photodiodes P vertically arranged, the adjacent photodiodes are paired and designated by paired notation, as just above. This is done for making the notation of the photodiodes arrayed comply with the conventional one adaptable for NTSC system. These photodiodes P are arrayed on a CCD substrate (not shown) in a matrix fashion. In the matrix array each column includes photodiodes of 2N and the columns of M are arrayed side by side. M vertical CCDs $C_1$ to $C_M$ are disposed adjacent to the M photodiodes columns, respectively. The number of vertical CCDs $C_1$ to $C_M$ is equal to the number of vertical picture elements in the IT-CCD 10, that is, the half (N) of the number of photodiodes contained in each photodiode column. The vertical CCDs $C_1$ to $C_M$ are connected at their final transfer stage to a horizontal CCD shift register S. A field shift gate (FSG) 34 is arranged with the gate portions each extending through gaps between the vertical photodiode columns $P_1$ to $P_M$ and the vertical CCDs $C_1$ to $C_M$. The FSG 34 is electrically connected to the gate terminal 19. When a pulse signal (a gate control signal) is applied from the CCD driver 20 to the FSG 34 through the gate terminal 27, the signal charge stored in the photodiodes P is transferred to the vertical CCDs $C_1$ to $C_M$. The signal charge transferred to the vertical CCDs $C_1$ to $C_M$ is sequentially transferred to the horizontal CCD shift register S for each stage. The charge is then read out from the output terminal 30 through the signal processor 29.

Figure 4:
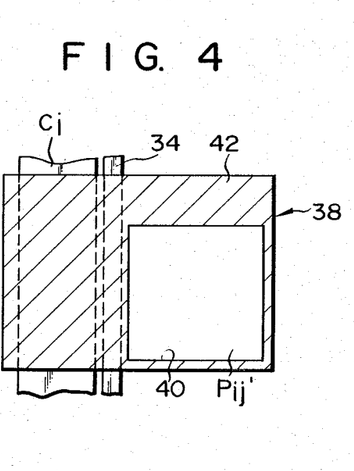
FIG. 4 is an enlarged view illustrating in detail an area corresponding to one picture element of the photographing area of the IT-CCD shown in FIG. 3.

FIG. 4 shows an enlarged plan view of an image sensing area corresponding to one picture element or one cell in the photosensitive portion 32 of the IT-CCD 10 in FIG. 3. A hatched portion 38 indicates an aluminum electrode serving to shut off the incident light. The Al electrode 38 has an opening 40 under which the photodiode $P_{ij}'$ is located. The vertical CCD $C_i$ and the FSG 34 run under the Al electrode 38, and hence are optically shielded from light rays by the Al electrode 38. An internal interconnection pattern (not shown) for driving the vertical CCD $C_i$ is formed under an area 42 of the Al electrode 38 located above the photodiode $P_{ij}$. The area 42 of the Al electrode 38 performs optical isolation between the photodiodes $P_{ij}$ and $P_{ij}'$.

Figure 5A:
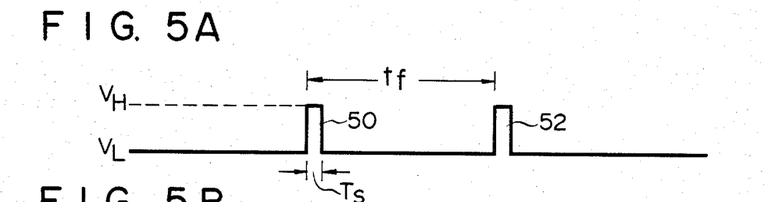
FIGS. 5A to 5C show a set of waveforms of signals generated at major portions useful in explaining the operation of the first embodiment shown in FIGS. 2 to 4.

FIG. 5A shows a waveform of a gate control signal supplied from the CCD driver 26 to the FSG 34 of the IT-CCD 10, through the gate terminal 27. The gate control signal has a pulse waveform changing stepwise between a low potential level $V_L$ and a high potential level $V_H$, as depicted in FIG. 5A. The signal charge generated and stored in the photosensitive section 32 is transferred to the vertical CCDs $C_1$ to $C_M$, by applying a high potential level $V_H$ to the FSG 34 of the IT-CCD 10 within one frame period $t_F$.

When an object is continuously photographed to sequentially obtain image signals in the fields, as in a movie camera such as a TV camera, for example, the high potential pulses 50 and 52 shown in FIG. 5A are repeatedly supplied to the FSG 34 of the IT-CCD 10 for every field $t_f$. In the electronic still camera as a first embodiment of the present invention, at least two pulses 50 and 52 are sufficient for obtaining an instantaneous still image. The pulse width $T_s$ of each of these pulses 50 and 52 corresponds to a transfer period of the signal charge from the photosensitive section 32 of the IT-CCD 10 to the vertical CCDs $C_1$ to $C_M$. In the present embodiment, the pulse width $T_s$ ranges from 1 $\mu$sec to 10 $\mu$sec, for example.

Figure 5B:
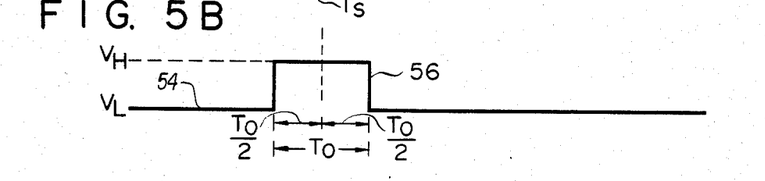

FIG. 5B shows a waveform of a shutter control signal 54 generated by the shutter period control circuit 20 for controlling the opening and closing of the shutter mechanism 14 of FIG. 2. In the present embodiment, when an object is photographed at a speed of 1/30 second or less, e.g., 1/1000 sec. (1 msec), the signal 54 has a pulse component 56 which holds a high potential level $V_H$ during a period $T_O = 1$ msec. The shutter mechanism 14 is operated under control of the pulse signal 54. It should be noted that a center point of the high potential level holding time $T_O$ of the pulse signal 54 is made coincident with the trailing edge of the pulse component 50 of the gate control signal of FIG. 5A. In other words, the shutter period control circuit 20 and the sync signal generating circuit 24 are synchronized with each other by the trigger generator 18 so that the application of the high potential of the gate control signal of FIG. 5A to the FSG 34 of the IT-CCD 10 is completed when the shutter mechanism 14 opens and then half of the entire opening time elapses. This is because during the high potential level time $T_s$ of the FSG 34 of the IT-CCD 10, the photosensitive section 32 of the IT-CCD 10 is still irradiated with the image light, and the signal charge generated in the photosensitive section 32 of the IT-CCD 10 is transferred into the vertical CCDs $C_1$ to $C_M$ within the period $T_s$.

Figure 5C:
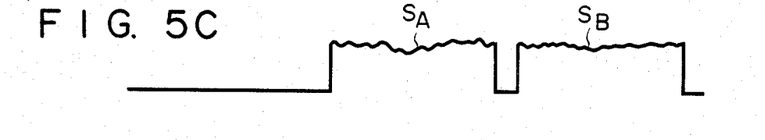

As described above, the opening period of the shutter mechanism 14 is centered at the trailing edge of the high potential pulse applied to the FSG 34 of the IT-CCD 10 and ranges to the periods adjacent to that trailing edge, i.e., the above fields A and B. Therefore, in the first half period $T_O/2$ of the shutter opening period $T_O$, the image light corresponding to the field A image is incident on the photosensitive section 32 of the IT-CCD 10. As a result, the signal charges representing the field A image are generated and stored in the photosensitive section 32. The signal charges of the field A respond to the high potential pulse 50 in the gate control signal of FIG. 5A applied to the FSG 34 of the IT-CCD 10 and are transferred to the vertical CCDs $C_1$ to $C_M$. Subsequently, during the later half period $T_O/2$ of the shutter opening period of time $T_O$, the image light corresponding to the field B image is applied to the IT-CCD 10, so that the signal charges representing the field B image are stored in the CCD photosensitive section 32. The signal charges of the field B respond to the high potential pulse 52 to be transferred to the vertical CCDs $C_1$ to $C_M$. As a result, one-frame image signal is obtained composed of a field A image signal $S_A$ and a field B image signal $S_B$, which are at substantially the same signal level, as shown in FIG. 5C.

As described above, since the center of the shutter opening time $T_O$ is coincident with the trailing edge of the high potential level application of the gate control signal supplied to the FSG 34, the time length of the light irradiation to the IT-CCD 10 during the field A period is equal to that during the field B period, these fields making one frame. Therefore, the output levels of the two fields' (A and B) image signals $S_A$ and $S_B$ are substantially equal to each other.

The image sensing apparatus according to the present invention employs a new and unique system for image sensing wherein the shutter is open over a period of the high potential $V_H$ applied to the FSG of the IT-CCD, to allow the image light to be applied to the CCD. With this feature, the signals of both the fields A and B can be produced even at a high speed operation such as 1/1000 second, for example. Therefore, the image sensing apparatus according to the present invention may be preferably applied to an electronic still camera without degrading the resolution.

It is desirable to make the trailing edge of the high level $V_H$ pulse exactly coincident with the time point $T_O/2$. Since the width $T_S$ of the $V_H$ application pulse is approximately 1 $\mu$sec, if the shutter opening period $T_O$ is 1/1000 sec (1 msec), for example, $T_S$ is approximately 0.1% of the shutter opening period $T_O$, and extremely short. Therefore, a slight displacement between the trailing edge of the $V_H$ application pulse and the center of the shutter opening period is not problematic.

Figure 6A:
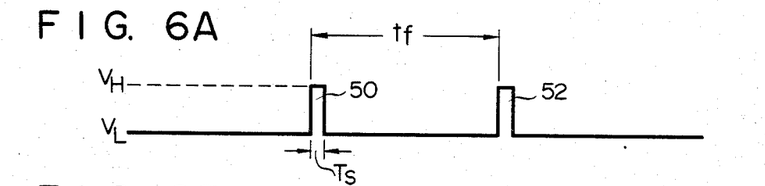
FIGS. 6A to 6C show waveforms of signals generated at major portions of the electronic still camera as a modification of the first embodiment.
Figure 6B:
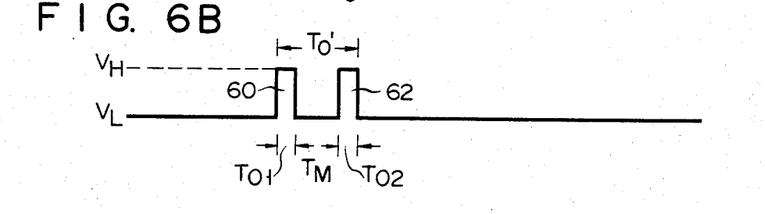
Figure 6C:
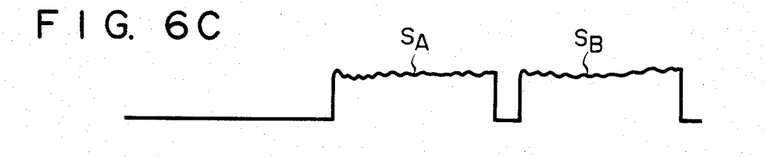

FIG. 6 shows a modification of the control for the shutter operation of the shutter mechanism 14 (FIG. 2). FIG. 6A shows a waveform of a gate control signal supplied from the CCD driver 26 to the FSG 34 of the IT-CCD 10, and is equal to that of FIG. 5A. FIG. 6B shows a pulse waveform of a shutter control signal from the shutter time control circuit 20. The shutter control signal has two pulse components 60 and 62 for one operation of a release button 16 (for sensing a single still image). The pulse components 60 and 62 appear separated from each other by a predetermined period $T_M$ with respect to the center of the high potential pulse generating period $T_S$ of the gate control signal of FIG. 6A. Accordingly, these pulse components 60 and 62 are produced within the period corresponding to the different successive field periods of one frame period. When the shutter control signal with the pulse waveform thus formed is generated from the shutter time control circuit 20, the shutter mechanism (FIG. 2) responds to the shutter control signal to open twice in response to one operation of the release button 16. To be more specific, when the release button 16 is operated by an operator, the shutter control signal is generated by the shutter period control circuit 20 on the basis of the operation of the trigger generator 18 and is supplied to the shutter mechanism 14 through the buffer circuit 22. Therefore, the shutter mechanism 14 first opens during a period $T_{O1}$ shown in FIG. 6B (this period is contained in one of the two periods forming one frame, for example, the field A), thereby allowing the incident light to be applied to the IT-CCD 10. During this period $T_M$, the shutter mechanism 14 closes. The period $T_S$ for applying the high potential $V_H$ to the FSG 34 of the IT-CCD 10 is contained in this period $T_M$. While the shutter mechanism 14 is temporarily closed, the signal charge (field A image signal) is read out as the first time signal to the vertical CCDs $C_1$ to $C_M$. After the high potential application period $T_S$ of the FSG 34 terminates, the shutter mechanism 14 responds to the pulse component 62 to open again. The shutter mechanism 14 opens as the second time during a short period as shown in FIG. 6B and is contained in another period, for example, the field B period. The image light is again applied to the IT-CCD 10 to pick up the field B image. The signal charges stored in the photosensitive section 32 of the IT-CCD 10 corresponding to the field B image, is transferred as the second time signal to the vertical CCDs $C_1$ to $C_M$, through the FSG 34 operating in response to the pulse component 52 next generated in FIG. 6A. In this way, the image signals of the two fields A and B are obtained as shown in FIG. 6C. The shutter speed of the first photographing is determined based on the entire period $T_O'$ from a start point of the first shutter opening period to an end point of the second shutter opening period.

The above modification also allows a high speed shuttering operation of the image sensing apparatus without suffering from a reduction of resolution. Further, in this modification a shutter closing period, i.e., the incident light prohibiting period $T_M$ is provided within the shutter open period $T_O'$ for the first photographing of a still picture ($T_M < T_O'$). Within the incident light prohibiting period $T_M$, the high potential pulse 50 supplied to the FSG 34 of the IT-CCD 10 is generated. Further, the signal charge transfer from the photosensitive section 32 of the IT-CCD 10 to the vertical CCDs $C_1$ to $C_M$ is performed within this perid $T_M$. As a result, the problem caused by the light incident on the IT-CCD 10 during the high potential period $T_S$ at the FSG 34 induced in the above-mentioned embodiment (FIG. 5) can be solved. The high potential pulse application to the FSG 34 by the IT-CCD 10 will suffice if it is positioned within the close period $T_M$ in the first still picture photographing. Therefore, it is possible to secure a large allowable range of phase displacement between the shutter opening operation and the high potential pulse application of the FSG 34. As a consequence, it is possible to prevent the electronic still camera from being complicated in construction.

As seen from the foregoing description, the present invention can attain a high shuttering speed operation with a high resolution. The present invention is adaptable for a system for improving a horizontal resolution. This will be described in detail.

Figure 7:
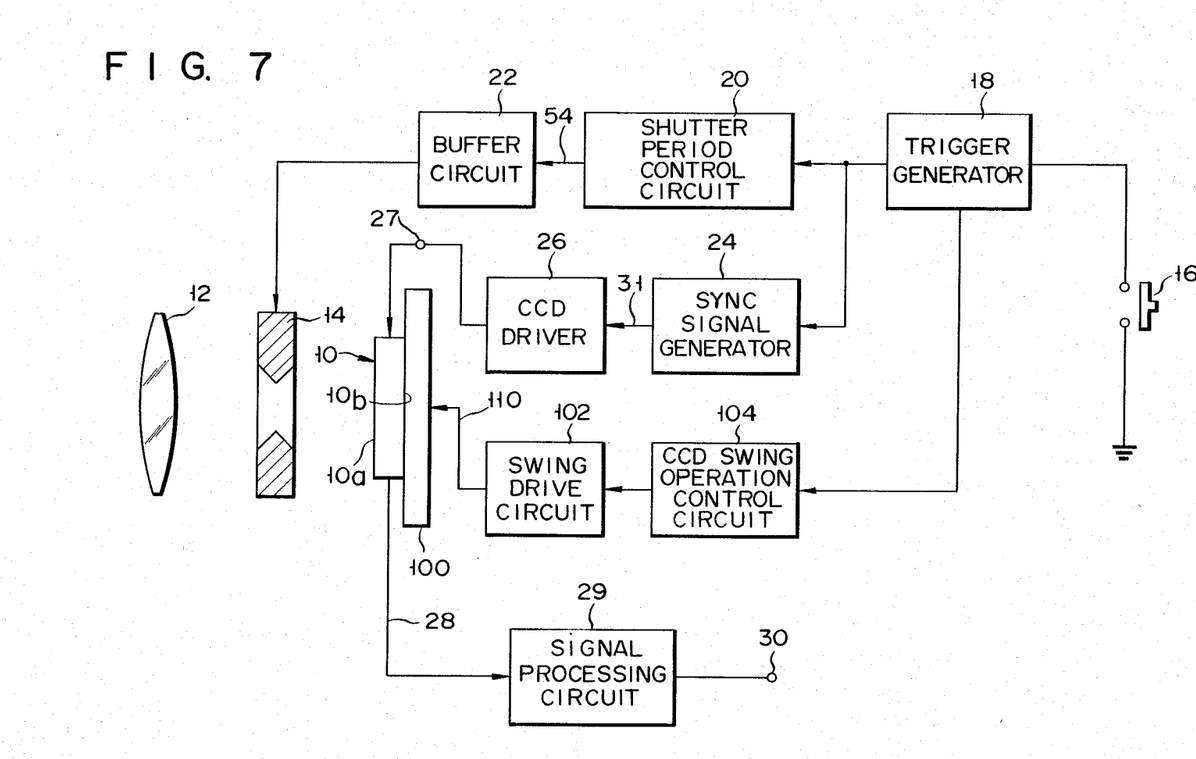
FIG. 7 shows a block diagram of an overall system of an electronic still camera which is a second embodiment of the present invention.

Turning now to FIG. 7, there is shown an arrangement of an electronic still camera which is another embodiment of the present invention. In FIG. 7, like reference symbols are used for designating like or equivalent portions in FIG. 2, and no explanation thereof will be given. In the present embodiment, the IT-CCD 10 is so arranged as to vibrate or swing with respect to image light coming through the lens 12 and the shutter mechanism 14.

The IT-CCD 10 is fixed to a CCD support table 100 on the surface 10b as the reverse side of the image sensing surface 10a of the IT-CCD 10. The CCD support table 100 vibrates in a plane orthogonal to incident image light 16 directed toward the IT-CCD 10 by a swing drive circuit 102, in a predetermined direction, e.g., the horizontal direction of the IT-CCD 10, at periods of one frame. Therefore, the IT-CCD 10 fixed to the support table 100 also vibrates or swings relative to the incident image light according to the swing mode. A CCD swing operation control circuit 104 provided between the trigger generator 18 and the swing drive circuit 102 responds to a trigger signal generated from the trigger generator 18 interlocked with the release button 16, which is operated for taking a still picture, and properly controls the start of the swing operation of the CCD support table 100.

Figure 8A:
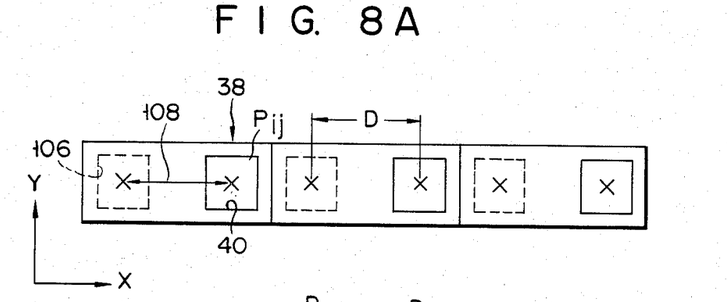
FIGS. 8A to 8B show a model of a vibration or swing mode of a part of the image pick-up area of an IT-CCD contained in the FIG. 7 camera and a triangle swing waveform, which are useful in explaining the operation of the swing operation of FIG. 7.
Figure 8B:
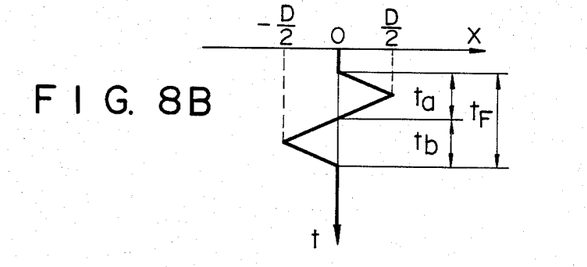

FIG. 8A schematically illustrates a plurality of one-cell areas shown in FIG. 4 for purposes of explaining the swing mode of the IT-CCD 10. The IT-CCD 10 swings or vibrates in an X-axial direction (horizontal direction) as indicated by an arrow 108 one time for one photographing operation of a still picture, so that the opening 40 with the unit cell $P_{ij}$ of the IT-CCD 10 positioned right thereunder positions at a first photographing position, as indicated by a solid line in FIG. 8A, during the field A period of one frame $t_F$, while it positions at a second position 106 as indicated by a broken line during the field B period $t_b$. FIG. 8B shows a swing mode called a triangle wave vibration mode of the IT-CCD 10. The CCD vibration width in this mode is indicated by a capital letter D. Therefore, if the coordinate of the center of the vibration is 0, the IT-CCD 10 reciprocately moves a distance D/2 in the positive and negative directions with respect to the vibration center 0. Therefore, during the one frame period $t_F$, substantially two spatial sampling areas are present in the horizontal direction of the IT-CCD 10. Therefore, the number of elements of the IT-CCD 10 is effectively doubled, so that the resolution in the horizontal direction is improved two times. While the vibration mode has been described using only the unit cell $P_{ij}$ for simplicity, the same thing can be correspondingly applied for the remaining cells.

The signal charges, which are generated and stored in the photosensitive section 32 of the swinging IT-CCD 10 during the periods of the fields A and B, are transferred to the vertical CCDs $C_1$ to $C_M$ at a proper time point during the vertical blanking period. The charge transfer period is synchronized with the vibration center of the IT-CCD 10.

Figure 9A:
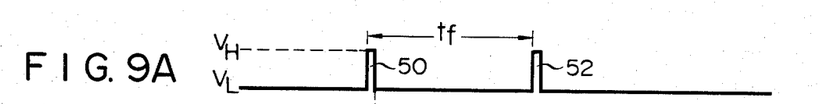
FIGS. 9A to 9D show waveforms of signals generated at major portions of the second embodiment.
Figure 9B:
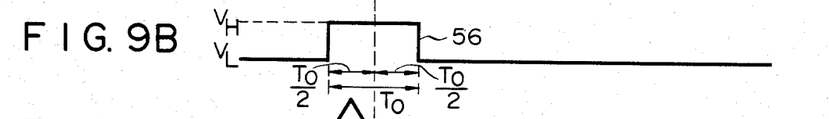
Figures 9C, 9D:
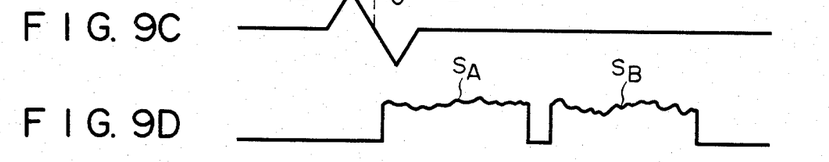

The technique to pick up a still image from the incident image light by swinging the IT-CCD 10, will be described referring to FIG. 9. FIG. 9A shows a waveform of a gate control signal supplied to the FSG 34 of the IT-CCD 10. A signal waveform shown in FIG. 9A is again illustrated, although it is the same as those shown in FIGS. 5A and 6A. FIG. 9B shows a waveform of a shutter control signal supplied from the shutter control circuit 20 to the shutter mechanism 14, and is similar to the signal waveform of FIG. 5B. FIG. 9C shows a waveform of a drive signal 110 supplied from the drive circuit 102 to the CCD support table 100 for swinging the IT-CCD 10. As seen from FIGS. 9A to 9C, it is preferable for a time point at which the IT-CCD 10, swinging according to the triangle vibration mode, is positioned at the swing center, to coincide with the center of the shutter opening period $T_O$. In this case, a slight difference of time is allowable. A still image of one frame is formed by composing the image outputs of the fields A and B, denoted as $S_A$ and $S_B$, which are thus formed (see FIG. 9D).

In this way, the horizontal resolution as well as the vertical resolution can be improved even in the high speed mode by horizontally moving the solid state image sensing chip.

Figure 10A:
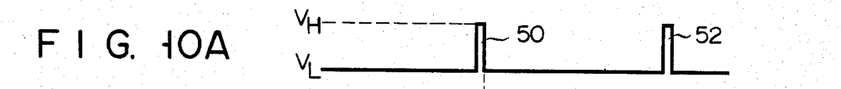
FIGS. 10A to 10D show waveforms of signals of the major portions of the electronic still camera as a modification of the second embodiment.
Figures 10B, 10C, 10D:
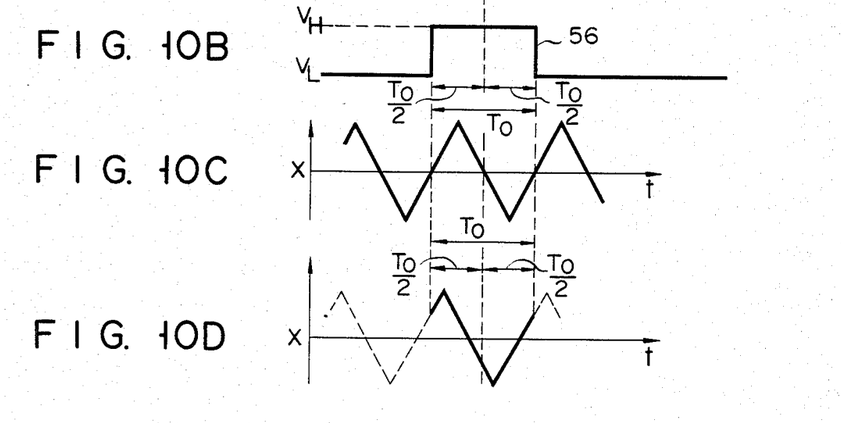

FIG. 10 shows a set of waveforms for illustrating a modification of the CCD swing technique shown in FIG. 9. FIGS. 10A and 10B show the same waveforms as those of FIGS. 9A and 9B. In the electronic still camera described referring to FIG. 9, the IT-CCD 10 is driven so as to swing once for a single photographing operation in synchronism with the shutter opening period $T_O$. In this modification, however, the CCD is vibrated before the shutter opening and is continued after the shutter is closed, as seen from FIG. 10C. According to this method, the shutter can be opened while the CCD is stably vibrated, thereby simplifying the coincidence of the center of the shutter opening period and the vibration center. Even if there is a slight displacement of the center of the shutter opening period from the vibration center, as shown in FIG. 10D (the portion of the waveform within the shutter opening period is illustrated by a solid line and the portion other than the former by a dotted line), noise component such as horizontal stripes does not appear in the reproduced image, although the resolution is slightly degraded. The slight loss of resolution arises from the fact that spacial sensitivity distributions in picture elements of the two field image signals $S_A$ and $S_B$, which constitute one actual picture element of a reproduced image, are undesirably superposed to each other.

Figure 11:
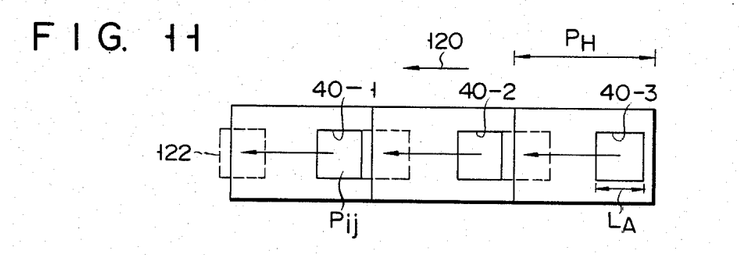
FIG. 11 partially illustrates an image pick-up area of the IT-CCD used in another modification of the second embodiment and driven to swing when a still picture is picked up.

FIG. 11 shows a modification of another embodiment of the present invention shown in FIGS. 7 to 9. In the modification shown in FIG. 11, the IT-CCD 10 is so designed that it moves in a predetermined direction, for example, the horizontal direction of the CCD as indicated by an arrow 120.

For example, during the opening period $T_O$ of the shutter mechanism 14, the IT-CCD 10 is moved when a still picture is taken, so as to satisfy the following equation.

$$V_S = (P_H - L_A)/T_O$$

where $P_H$ is a horizontal pitch of the photocell $P_{ij}$ of the IT-CCD 10, $L_A$ is a horizontal length of the opening 40 of the cell $P_{ij}$, and $V_S$ is a linear movement speed of the IT-CCD 10. Openings 40-1, 40-2, 40-3, ... of the picture element cell $P_{ij}$ are moved up to positions 122 as indicated by broken lines in FIG. 11, i.e., positions of the openings of the cells horizontally adjacent to each other. With this arrangement, there is no need to allow for a displacement of the shutter opening period with the time phase with respect to the movement of the image sensing chipe substrate. Therefore, the FIG. 11 embodiment is free from the problem of degradation of the resolution arising from a phase difference, which is generated in the modification of FIG. 10. When the shutter speed is changed, all a designer has to do is to merely change the linear movement speed $V_S$ corresponding to the change in shutter speed.

Figure 12A:
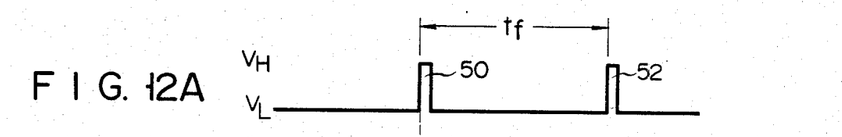
FIGS. 12A to 12C show waveforms of signals generated at major portions of an electronic still camera which is another modification of the second embodiment.
Figure 12B:
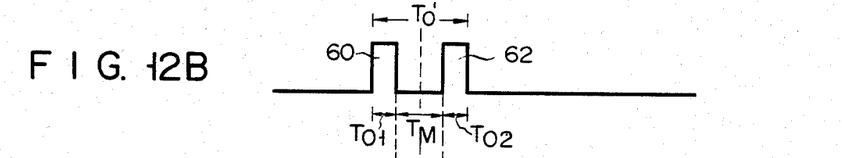
Figure 12C:
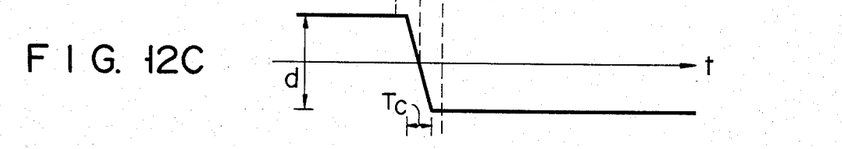

FIGS. 12A to 12C show waveforms of the gate control signal, the shutter control signal and the vibration mode of the IT-CCD in the modification of the electronic still camera as described referring to FIG. 6. The waveforms of FIGS. 12A and 12B are the same as those in FIGS. 6A and 6B, respectively, which are again illustrated for ease of explanation. According to this electronic still camera, during a first shutter opening period $T_{O1}$ shown in FIG. 12B, the IT-CCD 10 stops at a first position and receives the incident image light. During the shutter closing period $T_M$ the IT-CCD 10 moves at a constant speed in a given direction, e.g., a horizontal direction of the CCD, or in a direction corresponding to a slant direction on the reproduced picture, and reaches a second position immediately before the shutter closing period $T_M$. During a second opening period $T_{O2}$ of the shutter mechanism 14, the IT-CCD 10 stops at the second position again to receive the incident image light. In other words, the moving period of the CCD $T_c$ is set to be smaller than the shutter closing time $T_M$, $T_c < T_M$. A distance between the first and second positions, that is, a moving distance d within the shutter closing period $T_M$ of the IT-CCD 10 is selected like the distance D shown in FIG. 8A. As far as the CCD moving period $T_c$ is smaller than the shutter closing time $T_M$, the time displacement between the opening operation of the shutter mechanism 14 and the movement of the chip substrate of the IT-CCD, is not so important. In this modification, when picking up the still picture, the IT-CCD 10 displaces from the second position to the first position, as in the previous case.

Although the present invention has been shown and described with respect to particular embodiments, various changes and modifications which are obvious to a person skilled in the art to which the invention pertains are deemed to lie within the spirit and scope of the invention.

The solid state image sensing device applied to the present invention is not limited by the IT-CCD used in the embodiments mentioned above, but may be obviously replaced by any means if it can store the signal charges generated in the photosensitive section of each picture element for a given period and then transfer the signal changes to the readout section. The present invention is applicable for a so-called multi-layered sensor in which the photo-electric conversion is performed by use of the photoconductive film, and the readout of the signal charges is made using the conventional solid state image pick-up element. While the embodiment of FIG. 3 employs an array of photodiodes in which the photodiodes are vertically arranged in a line, these may be arranged in a zig-zag fashion.

In the above-mentioned embodiment, a couple of high potential pulses are generated in succession for the gate control signal supplied to the FSG of the IT-CCD, as shown in FIG. 12A. If a plurality of high potential pulses $V_H$ are applied at time points before and after the pulse pair, the present invention can be practiced with substantially the same effect.

The present invention is applicable for an electronic still camera with one, two or three solid image sensing chip substrates for effecting the color image pick-up. A reproduced picture with a high resolution can be obtained if the image sensing apparatus according to the present invention and the picture element displacing method are combined in the electronic camera with the two or three chip substrates. According to the present invention, in addition to the two-dimensional sensor as used in the above-mentioned embodiments, a one-dimensional sensor may be used to improve the resolution.

In the embodiment of FIG. 3, the number of the photodiodes in the vertical direction is two times that of the stages of the CCD. The present invention is also applicable to a case where the number of stages of both the elements are equal to each other.

In the above-mentioned embodiments, the solid state image sensing chip substrate is relatively moved in the direction corresponding to the horizontal direction on the reproduced picture. It is evident that the it may also be moved diagonally. The vibration mode of the IT-CCD 10 may be not only the triangle wave vibration mode, but also a sinusoidal wave vibration mode, a trapezoidal vibration mode, a step vibration mode or the like.

What we claim is:

1. An electronic image sensing apparatus for photographing a scene image to produce a still image of the photographed scene, said apparatus comprising:
   (a) a solid state image sensing element having a photosensitive section containing a plurality of photosensitive cells and a charge readout section, which receives incident image light to generate and store signal charges corresponding to the image light in said photosensitive section, and simultaneously transfers said signal charges to said charge readout section to read out the signal charges during a signal charge readout period, and responds to the image light coming in after the readout of said signal charge to generate and store signal charges again;
   (b) shutter means for opening at a proper shutter speed so as to irradiate the image light to said solid state image sensing element; and
   (c) control means connected to said solid state image sensing element and said shutter means, for driving said shutter means so that said shutter means opens before and after the signal charge readout period in synchronism with the signal charge readout operation of said image sensing element.

2. An electronic image sensing apparatus according to claim 1, wherein said control means comprises shutter drive means for causing said shutter means to continuously open for a period of time longer than said signal charge readout period during a period for opening said shutter means, which is centered substantially at the trailing edge of said signal charge readout period of said solid state image sensing element, whereby said image sensing element picks up a first field image during a first period as the first half of said period for opening said shutter means, and said image sensing element picks up a second field image during a second period as the second half of said period for opening said shutter means, thereby picking up the image of two fields in one photographing operation of a still picture.

3. An electronic image sensing apparatus according to claim 1, wherein said control means comprises shutter drive means for closing said shutter means during a shutter closing period which contains said signal charge readout period of said solid state image sensing element and which is longer than said signal readout period, and for opening said shutter means a plurality of times before and after said shutter closing period, whereby said image sensing element receives image light when said shutter means intermittently opens the plurality of times, thereby picking up the image of a plurality of fields for one photographing operation of a still picture.

4. An electronic image sensing apparatus according to claim 1, further comprising means connected to said solid state image sensing element, for moving said solid state image sensing element relative to said incident image light to receive the incident image light with the opening operation of said shutter means.

5. An electronic image sensing apparatus according to claim 4, wherein said means for moving said image sensing element includes vibrating table means, mechanically and rigidly coupled with said image sensing element, for vibrating or swinging at given periods and in a given direction, thereby swinging said image sensing element relative to said incident image light periodically.

6. An electronic image sensing apparatus according to claim 2, further comprising means connected to said solid state image sensing element, for displacing said image sensing element so that said image sensing element takes different positions during said first and second periods of said opening period of said shutter means.

7. An electronic image sensing apparatus according to claim 6, wherein said displacing means continuously swings said solid state image sensing element at given periods.

8. An electronic image sensing apparatus according to claim 3, further comprising means connected to said solid state image sensing element for displacing said image sensing element so that said image sensing element takes different positions during a plurality of opening operations of said shutter means.

9. An electronic image sensing apparatus according to claim 8, wherein said displacing means continuously swings said solid state image sensing element at given periods.

* * * * *